United States Patent
Lim et al.

(10) Patent No.: US 11,794,635 B2
(45) Date of Patent: Oct. 24, 2023

(54) LAMP CONTROLLER INTERLOCKING SYSTEM OF CAMERA BUILT-IN HEADLAMP AND METHOD THEREOF

(71) Applicant: HYUNDAI MOBIS CO., LTD., Seoul (KR)

(72) Inventors: Jung Sub Lim, Yongin-si (KR); Myeong Je Kim, Yongin-si (KR); Han Seong Yu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 94 days.

(21) Appl. No.: 17/135,717

(22) Filed: Dec. 28, 2020

(65) Prior Publication Data

US 2022/0055527 A1 Feb. 24, 2022

(30) Foreign Application Priority Data

Aug. 24, 2020 (KR) .......................... 10-2020-0106436

(51) Int. Cl.
*B60Q 1/14* (2006.01)
*B60R 11/04* (2006.01)

(52) U.S. Cl.
CPC .............. *B60Q 1/143* (2013.01); *B60R 11/04* (2013.01); *B60Q 2300/42* (2013.01)

(58) Field of Classification Search
CPC .. B60Q 1/143; B60Q 2300/42; B60Q 1/1432; B60Q 1/1423; B60R 11/04; H04N 5/2256; H04N 5/2329; H04N 5/2354; H04N 5/3532
See application file for complete search history.

(56) References Cited

U.S. PATENT DOCUMENTS

| 8,993,951 B2 * | 3/2015 | Schofield ................. H04N 7/18 382/104 |
| 9,361,502 B2 * | 6/2016 | Goren .................... G06K 7/146 |
| 2007/0177028 A1 | 8/2007 | Kyoung |

(Continued)

FOREIGN PATENT DOCUMENTS

| CN | 102713930 A | 10/2012 |
| CN | 102804752 A | 11/2012 |

(Continued)

OTHER PUBLICATIONS

Office Action dated May 23, 2023, in Chinese Patent Application No. 202011597565.4.

(Continued)

*Primary Examiner* — Rowina J Cattungal
(74) *Attorney, Agent, or Firm* — H.C. Park & Associates, PLC

(57) ABSTRACT

A lamp controller interlocking system of a camera built-in headlamp inventive concepts includes a headlight module integrated with a camera and a light source, a camera controller generating a single frame image by composing an image captured in a short exposure section, in which a shutter opening time of the camera is relatively short, and an image captured in a long exposure section, in which the shutter opening time of the camera is relatively long, and a lamp controller controlling the light source to emit more light in the long exposure section more than in the short exposure section in synchronization with timings of the long exposure section and the short exposure section of the camera.

14 Claims, 6 Drawing Sheets

(56) References Cited

U.S. PATENT DOCUMENTS

| | | |
|---|---|---|
| 2008/0251874 A1 | 10/2008 | Ishibe |
| 2011/0074956 A1 | 3/2011 | Faber et al. |
| 2012/0105639 A1 | 5/2012 | Stein et al. |
| 2012/0188404 A1 | 7/2012 | Muukki et al. |
| 2013/0033640 A1 | 2/2013 | Lee |
| 2016/0198089 A1 | 7/2016 | Kazutaka |
| 2019/0141264 A1* | 5/2019 | Kang ................... G06F 18/00 |

FOREIGN PATENT DOCUMENTS

| | | |
|---|---|---|
| CN | 110620857 A | 12/2019 |
| DE | 102008002026 | 12/2009 |
| JP | 2013055482 | 3/2013 |
| JP | 2013055482 A | 3/2013 |
| KR | 10-2008-0086414 | 9/2008 |
| KR | 10-2009-0055228 | 6/2009 |
| KR | 20170138708 A | 12/2017 |
| KR | 10-2019-0143390 | 12/2019 |
| KR | 10-2136889 B1 | 7/2020 |
| WO | 2009069897 A2 | 6/2009 |

OTHER PUBLICATIONS

Office Action dated Aug. 15, 2023, in Chinese Application No. 202011597565.4.

\* cited by examiner

LAMP CONTROLLER INTERLOCKING SYSTEM OF CAMERA BUILT-IN HEADLAMP AND METHOD THEREOF

CROSS-REFERENCE TO RELATED APPLICATION

This application claims priority from and the benefit of Korean Patent Application No. 10-2020-0106436, filed on Aug. 24, 2020 which is hereby incorporated by reference for all purposes as if set forth herein.

BACKGROUND

Field

Exemplary embodiments relate to a lamp controller interlocking system of a camera built-in headlamp and a method thereof, and more specifically, to a lamp controller interlocking system of a camera built-in headlamp and a method thereof that may concentrate a headlamp light source at a time when a camera needs light by linking a headlamp light source with the camera built in a headlamp, thereby improving the quality and recognition rate of an image captured by using the camera.

Discussion of the Background

In general, a camera (or a camera module) for improving a driver's convenience and supporting the driver is installed in a vehicle. For example, the camera includes a front camera, a rear camera, an around-view monitoring system, a black box, or the like.

The image (e.g., image information) captured by the camera is transmitted to a camera controller that processes camera images to generate various pieces of driver assistance information such as vehicle information, traffic light information, pedestrian information, and obstacle information.

The camera installed in the vehicle performs various functions through a single cable, and performs functions such as the power supply to a camera, the transmission of a video signal, the transmission/reception of a control signal (I2C), and the like, using the single cable.

That is, the single cable connected to the camera is input to a camera controller, and the camera controller may analyze and process image information to output an image signal through a vehicle internal network.

In the meantime, to increase the recognition rate of a camera by linking a camera built-in headlamp with a light source, it is necessary to exchange real-time timing information. In the conventional scheme, a camera controller analyzes the image received from the camera and propagates information through CAN bus of a vehicle.

However, in this case, synchronization may be impossible in real time due to image processing delay time and CAN communication delay time.

The above information disclosed in this Background section is only for enhancement of understanding of the background of the invention and, therefore, it may contain information that does not constitute prior art.

SUMMARY

The inventive concepts has been made to address the above-mentioned problems occurring in the prior art while advantages achieved by the prior art are maintained intact.

An aspect of the inventive concepts provides a lamp controller interlocking system of a camera built-in headlamp that concentrates a headlamp light source when a camera needs light, by interlocking a camera built in a headlamp with the headlamp light source, and a method thereof; to address issues that a speed difference between a headlamp signal and a camera signal occurs through CAN communication in a vehicle, the lamp controller interlocking system of a camera built-in headlamp, and the method thereof may output a horizontal synchronization signal and a vertical synchronization signal of an image sensor to a lamp controller, may synchronize the timings of the headlamp and the camera, and may supply light to the camera with the same energy, thereby improving the quality of a camera image and increasing energy efficiency.

The technical problems to be addressed by the present inventive concept are not limited to the aforementioned problems, and any other technical problems not mentioned herein will be clearly understood from the following description by those skilled in the art to which the inventive concepts pertains.

According to an aspect of the inventive concepts, a lamp controller interlocking system of a camera built-in headlamp may include a headlight module integrated with a camera and a light source, a camera controller generating a single frame image by composing an image captured in a short exposure section, in which a shutter opening time of the camera is relatively short, and an image captured in a long exposure section, in which the shutter opening time of the camera is relatively long, and a lamp controller controlling the light source to emit more light in the long exposure section more than in the short exposure section in synchronization with timings of the long exposure section and the short exposure section of the camera.

In an embodiment, the lamp controller may estimate a section in which a vertical synchronization signal is input from a section in which a horizontal synchronization signal is input after a start point of one predetermined frame period, as the short exposure section, and may estimate the section in which the vertical synchronization signal is input from the section in which the horizontal synchronization signal is input subsequently to the short exposure section, as the long exposure section.

In an embodiment, the lamp controller may receive a horizontal synchronization signal and a vertical synchronization signal of an image captured through the camera from the camera.

In an embodiment, in the camera, an output terminal of the horizontal synchronization signal and the vertical synchronization signal may include an insulating structure.

In an embodiment, the lamp controller may receive a horizontal synchronization signal and a vertical synchronization signal of an image captured through the camera from the camera controller.

In an embodiment, in the camera controller, an output terminal of the horizontal synchronization signal and the vertical synchronization signal may include an insulating structure.

According to another aspect of the inventive concepts, a lamp controller interlocking method of a camera built-in headlamp may include generating a single frame image by composing an image captured in a short exposure section, in which a shutter opening time of a camera is relatively short, and an image captured in a long exposure section, in which the shutter opening time of the camera is relatively long, through a camera controller included in a headlight module integrated with the camera and a light source, and control ing the light source to emit more light in the long exposure section more than in the short exposure section in synchronization with timings of the long exposure section and the short exposure section of the camera.

In an embodiment, the controlling may include estimating a section in which a vertical synchronization signal is input from a section in which a horizontal synchronization signal is input after a start point of one predetermined frame period, as the short exposure section, and estimating the section in which the vertical synchronization signal is input from the section in which the horizontal synchronization signal is input after the short exposure section, as the long exposure section.

In an embodiment, the controlling may include receiving a horizontal synchronization signal and a vertical synchronization signal of an image captured through the camera from the camera.

In an embodiment, the controlling may include receiving a horizontal synchronization signal and a vertical synchronization signal of an image captured through the camera from the camera controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
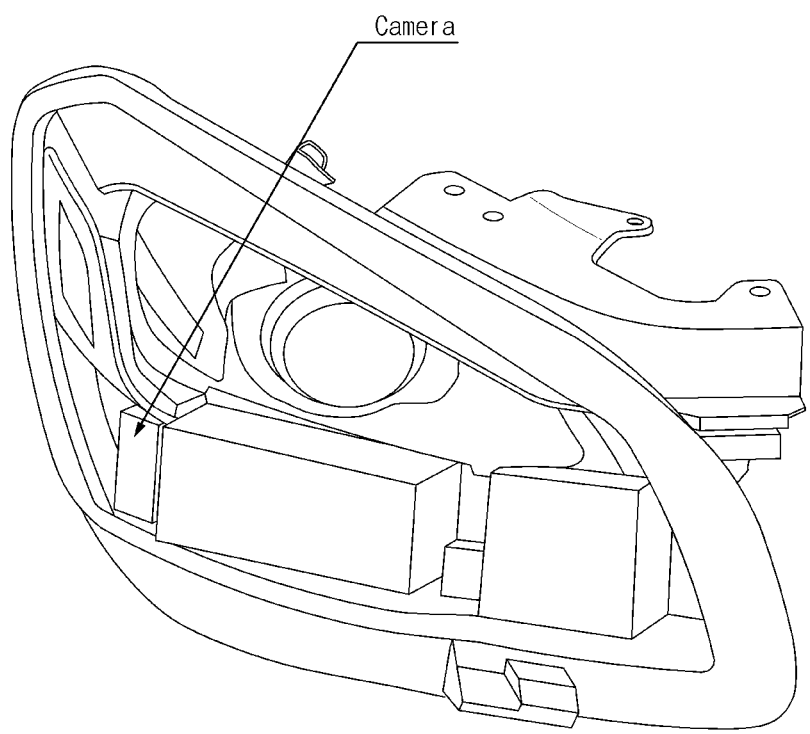
FIG. 1 is a view illustrating a headlamp constituting a lamp controller interlocking system of a camera built-in headlamp according to an embodiment of the inventive concepts.

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the inventive concepts will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the inventive concepts.

In describing elements of exemplary embodiments of the inventive concepts, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the inventive concepts and the relevant art and will not be interpreted in an idealized or overly formal sense unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, various embodiments of the inventive concepts will be described in detail with reference to FIGS. 1 to 5.

Figure 2:
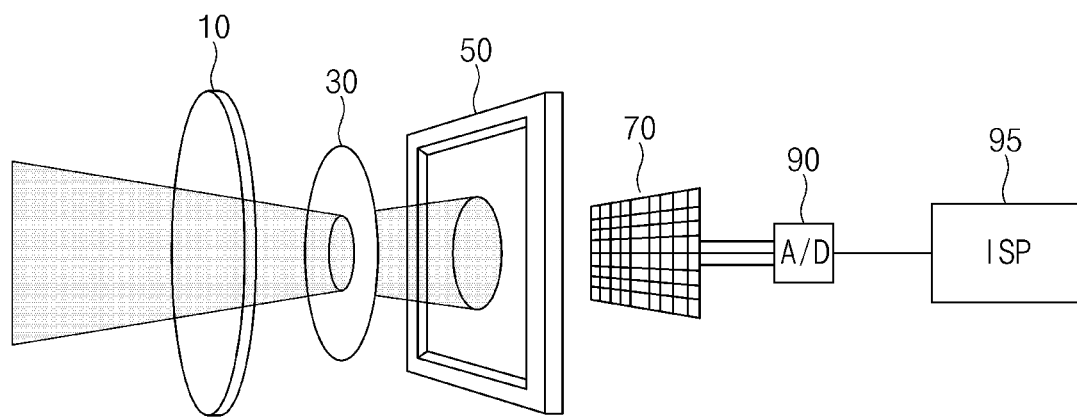
FIG. 2 is a diagram illustrating an image obtaining device constituting a lamp controller interlocking system of a camera built-in headlamp according to an embodiment of the inventive concepts.
Figure 3:
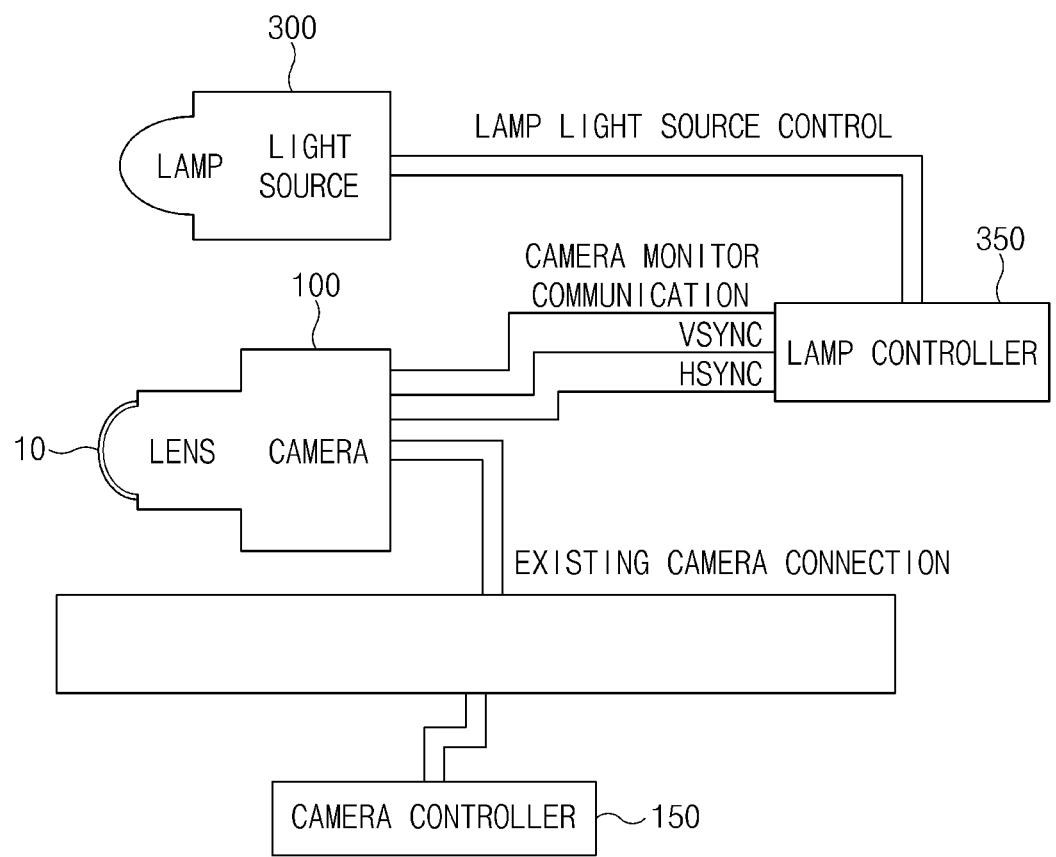
FIG. 3 is a block diagram illustrating a lamp controller interlocking system of a camera built-in headlamp according to an embodiment of the inventive concepts.
Figure 4:
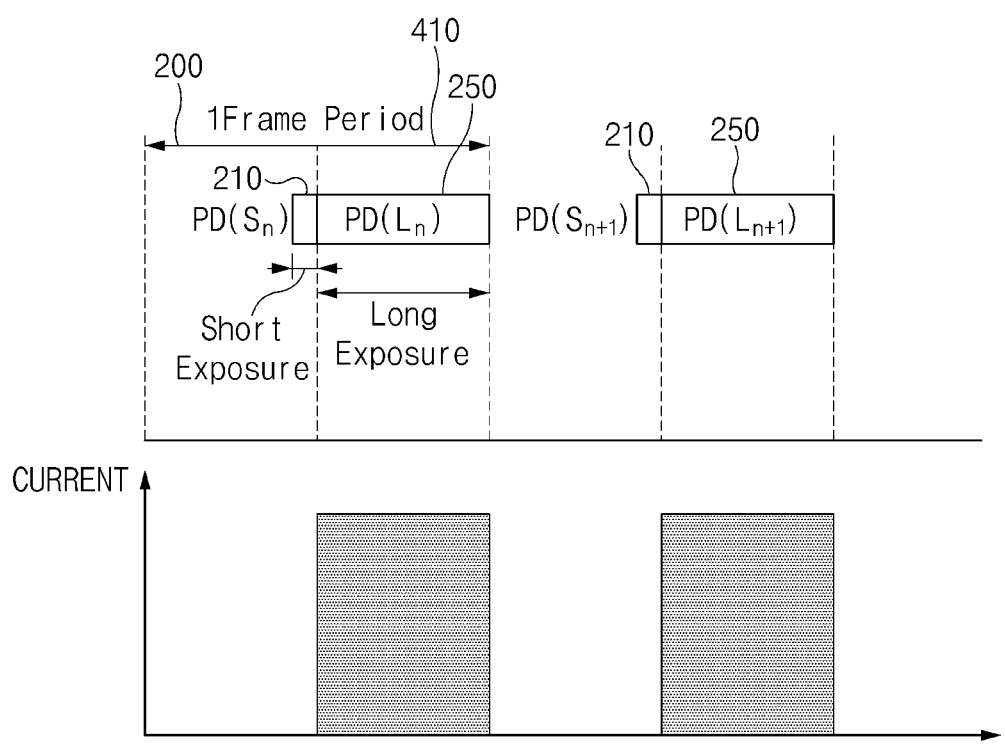
FIG. 4 is a view illustrating an example of a lamp current according to short exposure and long exposure in a lamp controller interlocking system of a camera built-in headlamp according to an embodiment of the inventive concepts.
Figure 5:
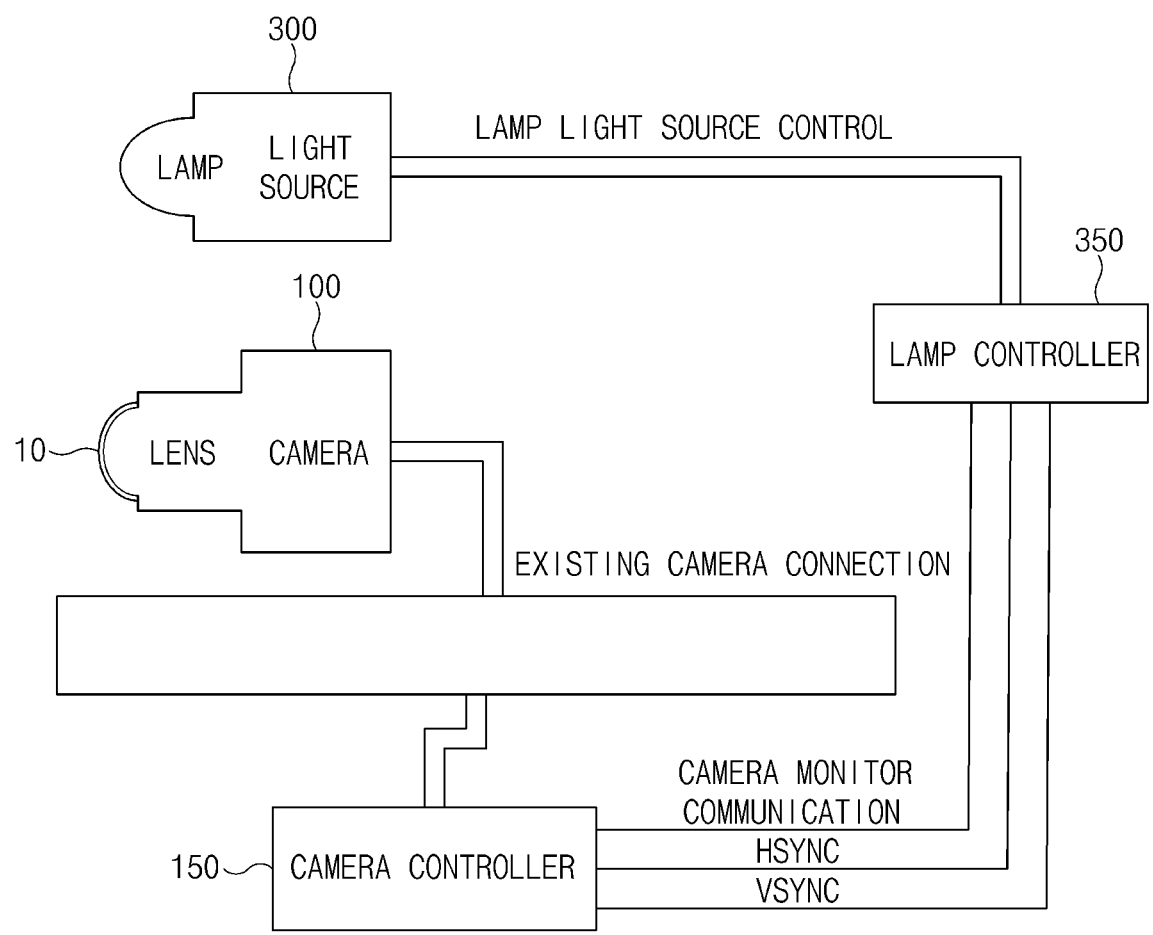
FIG. 5 is another block diagram illustrating a lamp controller interlocking system of a camera built-in headlamp according to an embodiment of the inventive concepts.

FIG. 1 is a view illustrating a headlamp constituting a lamp controller interlocking system of a camera built-in headlamp according to an embodiment of the inventive concepts. FIG. 2 is a diagram illustrating an image obtaining device constituting a lamp controller interlocking system of a camera built-in headlamp according to an embodiment of the inventive concepts. FIG. 3 is a block diagram illustrating a lamp controller interlocking system of a camera built-in headlamp according to an embodiment of the inventive concepts. FIG. 4 is a view illustrating an example of a lamp current according to short exposure and long exposure in a lamp controller interlocking system of a camera built-in headlamp according to an embodiment of the inventive concepts. FIG. 5 is another block diagram illustrating a lamp controller interlocking system of a camera built-in headlamp according to an embodiment of the inventive concepts.

Referring to FIGS. 1 to 5, the lamp controller interlocking system of a camera built-in headlamp according to an embodiment of the inventive concepts may be provided in a vehicle and may include a camera controller 150, a lamp controller 350, and a headlight module 200, which is integrated with a camera 100 and a light source 300 such as an LED, or the like.

Referring to FIGS. 2 to 4, the camera 100 may include a lens 10, an aperture 30, a shutter 50, an image sensor 70, an A/D converter (ADC) 90, and an Image Signal Processing (ISP) module 95.

Light reflected from a subject (not illustrated) may be incident to the image sensor 70 through the lens 10 by controlling the aperture 30 and the shutter 50.

The image sensor 70 may be a solid-state imaging device such as a Charge-Coupled Device (CCD) or Complementary Metal-Oxide Semiconductor (CMOS).

The image sensor 70 may measure the intensity of incident light and may output an image signal corresponding to the measured light. The image signal output by the image sensor 70 may be converted to a digital image signal through the ADC 90, and the converted digital image signal may be entered to the ISP module 95.

The ISP module 95 may perform image processing such as color interpolation, color correction, gamma correction, auto white balancing, and the like on the received image signal. The image signal processed by the ISP module 95 may be displayed through a separate display device inside a vehicle and then may be provided to a driver.

The image sensor 70 has a narrower range of detectable brightness than the human eye. To overcome the difficulty, the image sensor 70 may compose images obtained by differently setting exposure times (ET) of light, may apply a technology to increase a brightness range, and thus may generate a High Dynamic Range (HDR) image.

Exposure time may refer to a time when the image sensor 70 is exposed to an amount of light, and may depend on the value of the aperture 30, the speed of the shutter 50, ISO (International Organization for Standardization) sensitivity, or the like.

In the inventive concepts, a two-step exposure policy may be set. To set the two-step exposure policy, a short exposure time (SET) of the ET is first output, and then a long exposure time (LET) of the ET is output by inputting an operation scenario of the camera 100 in advance. The SET may be an exposure time shorter than the LET, and the LET may be an exposure time longer than the SET.

For reference, in the two-step exposure policy, two vertical synchronization signals may be output within a single frame period. The SET and LET may be output. In a three-step exposure policy, three vertical synchronization signals may be output within a single frame period. The SET, intermediate exposure time (IET), and LET may be output.

The camera controller 150 may control the speed of the shutter 50, the degree of opening of the aperture 30, or the like when shooting an image, with reference to the previously input operation scenario, and thus may obtain a short exposure image captured in SET and a long exposure image captured in LET.

In addition, in the short exposure image, the light in the dark portion is insufficient, but the bright portion may be obtained normally. In such a case, the pixels of the image sensor 70 are saturated. However, in the long exposure image, the dark portion may be obtained normally. A high dynamic range (HDR) image may be generated by composing the short exposure image and the long exposure image.

As the data transmission method of the camera 100, the image signal captured through the camera 100 may be expressed as the intensity of light for each cell of the image sensor 70.

Generally, a 2D image may be composed of horizontal pixels and vertical pixels. For example, a Full HD image may have a resolution of 1920×1080.

That is, a single image may have 1920 lines. Each line may be composed of 1080 pixels. Whenever each of the 1920 lines is transmitted, the image sensor 70 may transmit a horizontal synchronization (HSYNC) signal. Whenever a single image is transmitted, the image sensor 70 may transmit a vertical synchronization (VSYNC) signal.

Referring to FIG. 3, the camera 100 and the lamp controller 350 may be directly connected through a wiring structure for real-time synchronization between the camera 100 and the lamp controller 350.

Accordingly, the HSYNC signal and the VSYNC signal output by the camera 100 through image capture operations may be directly output from the camera 100 to the lamp controller 350.

Referring to FIGS. 3 and 4, the lamp controller 350 may analyze the input horizontal synchronization signal and vertical synchronization signal during a single preset frame period 410.

In the inventive concepts, according to the preset operation scenario for the shutter open operation of the camera 100, the shutter 50 opening time may be controlled such that the SET section is output first, and then the shutter open time may be controlled such that the LET section is output.

Signals output from the camera 100 may include a first horizontal synchronization signal and a first vertical synchronization signal during the SET, and a second horizontal synchronization signal and a second vertical synchronization signal during the LET.

After a specific time has elapsed from a start point of one frame period (PD) 410, a time section of the period 410 in which the first vertical synchronization signal is input after the section in which the first horizontal synchronization signal is input from the camera 100 to the lamp controller 350 may be estimated as a short exposure time 210. Subsequent to the short exposure time 210, a time section of the period 410 from which the second horizontal synchronization signal is input, to a section of the period 410 in which the second vertical synchronization signal is input may be estimated as a long exposure time 250. The short exposure time may be abbreviated PD(Sn, Sn+1, etc.). The long exposure time may be abbreviated PD(Ln, Ln+1, etc.).

That is, until the vertical synchronization signal is output after the horizontal synchronization signal is output, it may be estimated that the shutter of a specific exposure time is opened.

Accordingly, by interlocking with the horizontal synchronization signal and the vertical synchronization signal directly input from the camera 100, the lamp controller 350 may block the current supplied to the light source 300 to turn off the light source 300 in the SET section after the first HSYNC signal and the first VSYNC signal are sent, and may supply the current to the light source 300 to turn on the light source 300 in the LET section after the second HSYNC signal and the second HSYNC signal are sent.

The quality of the image captured through the camera 100 may be improved by interlocking the lamp controller 350 with the camera 100 to concentrate the light used by the camera 100 in the long exposure section. The energy efficiency may be increased by turning off the light source 300 in the short exposure section.

In other words, the lamp controller 350 controls emitting more light from the light source 300 during a long exposure section compared to a short exposure, by synchronizing the timings of the long exposure section and the short exposure section of the camera 100.

Referring to FIG. 5, in another type of the wiring structure for real-time synchronization between the camera 100 and the lamp controller 350, the camera controller 150 may be connected to the camera 100 using a high-speed communication line (FAKRA or the like). The light source 300 may be controlled through the interlocking with a horizontal synchronization signal and a vertical synchronization signal output from the camera 100 by connecting the camera controller 150 and the lamp controller 350.

At this time, the horizontal synchronization signal and the vertical synchronization signal output from the camera 100 may be serialized, may be transmitted to the camera controller 150, and may be transmitted to the lamp controller 350 by separating the serialized signal in the camera controller 150 again in parallel.

In addition, an output terminal from which the horizontal synchronization signal and the vertical synchronization signal are output in the camera 100 and the camera controller 150 may further include a signal amplifier circuit while having an insulating structure.

Accordingly, even though static electricity or the like occurs due to the influences of peripheral parts, the camera 100 and the camera controller 150 may be protected from electrical damage, and may prevent the output signal from being reduced due to environmental influences.

Figure 6:
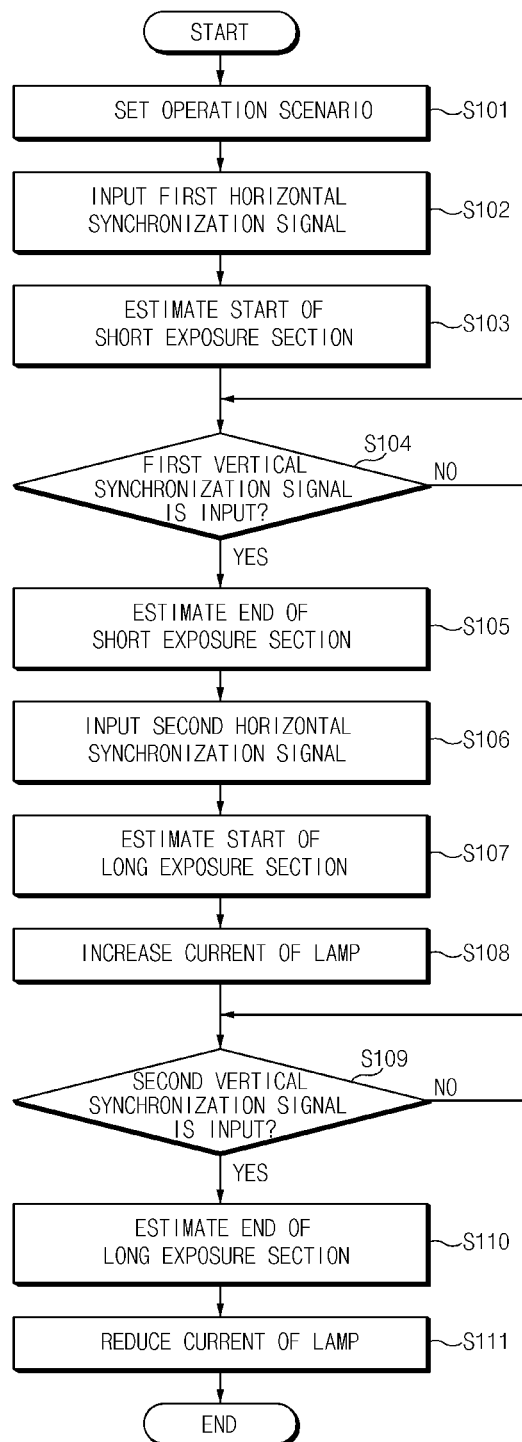
FIG. 6 is a block diagram illustrating a lamp controller interlocking method of a camera built-in headlamp according to an embodiment of the inventive concepts.

Hereinafter, according to another embodiment of the inventive concepts, a lamp controller interlocking method of a camera built-in headlamp will be described in detail with reference to FIG. 6. FIG. 6 is a flowchart illustrating a lamp controller interlocking method of a camera built-in headlamp according to an embodiment of the inventive concepts.

As illustrated and described, the lamp controller interlocking system of the camera built-in headlamp of FIG. 3 performs the process of FIG. 6.

First, a two-step exposure policy is set in that the SET of the exposure time is output first, and then the LET thereof is output by inputting the operation scenario of the camera 100 in advance (S101).

Next, after a predetermined time at the start point of one frame period, when the first horizontal synchronization signal is input (S102) to the lamp controller 350, the start of the short exposure section may be estimated (S103).

Subsequently, when the first vertical synchronization signal is input (S104), the end point of the short exposure section may be estimated (S105).

Then, when the second horizontal synchronization signal is input (S106), the start of the long exposure section may be estimated (S107). The lamp controller 350 may increase the current for the light source 300 to turn on the light source 300 (S108).

Next, when the second vertical synchronization signal is input (S109), it may be estimated as the end point of the long exposure section (S110). The lamp controller 350 may reduce the current for the light source 300 to turn off the light source 300 (S111).

As described above, according to an embodiment of the inventive concepts, a lamp controller interlocking system and method of a camera built-in headlamp may concentrate a headlamp light source when a camera uses light, by interlocking a camera built in a headlamp with the headlamp light source. This may be done to address issues that a speed difference between a headlamp signal and a camera signal occurs through controller area network (CAN) communication in a vehicle, the lamp controller interlocking system and method of a camera built-in headlamp may output a horizontal synchronization signal and a vertical synchronization signal of an image sensor to a lamp controller, may synchronize the timings of the headlamp and the camera, and may supply light to the camera with the same energy, thereby improving the quality of a camera image and increasing energy efficiency.

In the meantime, according to an embodiment of the inventive concepts, the lamp controller interlocking method of the camera built-in headlamp according to operations S101 to S111 may be programmed and stored in a computer-readable medium.

Hereinabove, although the inventive concepts has been described with reference to exemplary embodiments and the accompanying drawings, the inventive concepts is not limited thereto, but may be variously modified and altered by those skilled in the art to which the inventive concepts pertains without departing from the spirit and scope of the inventive concepts claimed in the following claims.

Therefore, embodiments of the inventive concepts are not intended to limit the technical spirit of the inventive concepts, but provided only for the illustrative purpose. The scope of protection of the inventive concepts should be construed by the attached claims, and all equivalents thereof should be construed as being included within the scope of the inventive concepts.

The inventive concepts may concentrate a headlamp light source when a camera uses light, by interlocking a camera built in a headlamp with the headlamp light source; to address issues that a speed difference between a headlamp signal and a camera signal occurs through CAN communication in a vehicle, the inventive concepts may output a horizontal synchronization signal and a vertical synchronization signal of an image sensor to a lamp controller, may synchronize the timings of the headlamp and the camera, and may supply light to the camera with the same energy, thereby improving the quality of a camera image and increasing energy efficiency.

Besides, a variety of effects directly or indirectly understood through the specification may be provided.

Hereinabove, although the inventive concepts has been described with reference to exemplary embodiments and the accompanying drawings, the inventive concepts is not limited thereto, but may be variously modified and altered by those skilled in the art to which the inventive concepts pertains without departing from the spirit and scope of the inventive concepts claimed in the following claims.

What is claimed is:

1. A lamp controller interlocking system of a camera built-in headlamp, the system comprising:
   a headlight module integrated with a camera and a light source;
   a camera controller configured to generate a single frame image by composing an image captured in a short exposure section, in which a shutter opening time of the camera is relatively short, and an image captured in a long exposure section, in which the shutter opening time of the camera is relatively long;

a lamp controller configured to control the light source to emit more light in the long exposure section than in the short exposure section in synchronization with the relatively long shutter opening time of the long exposure section and the relatively short shutter opening time of the short exposure section of the camera;

wherein the camera controller is configured to generate a single frame image by composing an image captured in a short exposure section, in which a shutter opening time of a camera is relatively short, and an image captured in a long exposure section, in which the shutter opening time of the camera is relatively long, through the camera controller included in the headlight module integrated with the camera and a light source, wherein the lamp controller estimates the short exposure section as a section in which a vertical synchronization signal is input from a time section in which a horizontal synchronization signal is input after a start point of one predetermined frame period, wherein the horizontal synchronization signal and the vertical synchronization signal output by the camera are serialized onto one signal line and received by the camera controller, and wherein the horizontal synchronization signal and the vertical synchronization signal are unserialized onto two signal lines by the camera controller for output to the lamp controller.

2. The system of claim 1, wherein the lamp controller estimates the long exposure section as a section in which the vertical synchronization signal is input from the time section in which the horizontal synchronization signal is input subsequently to the short exposure section.

3. The system of claim 1, wherein the lamp controller receives the horizontal synchronization signal and the vertical synchronization signal of an image captured through the camera from the camera.

4. The system of claim 3, wherein, in the camera, an output terminal of the horizontal synchronization signal and the vertical synchronization signal includes an insulating structure.

5. The system of claim 1, wherein the lamp controller receives the horizontal synchronization signal and the vertical synchronization signal of an image captured through the camera from the camera controller.

6. The system of claim 5, wherein, in the camera controller, an output terminal of the horizontal synchronization signal and the vertical synchronization signal includes an insulating structure.

7. A lamp controller interlocking method of a camera built-in headlamp, the method comprising:

generating, by a camera controller, a single frame image by composing an image captured in a short exposure section, in which a shutter opening time of a camera is relatively short, and an image captured in a long exposure section, in which the shutter opening time of the camera is relatively long, through a camera controller included in a headlight module integrated with the camera and a light source;

controlling, by a lamp controller, the light source to emit more light in the long exposure section more than in the short exposure section in synchronization with the relatively long shutter opening time of the long exposure section and the relatively short shutter opening time of short exposure section of the camera, wherein the lamp controller estimates the short exposure section as a section in which a vertical synchronization signal is input from a time section in which a horizontal synchronization signal is input after a start point of one predetermined frame period;

serializing a horizontal synchronization signal and a vertical synchronization signal output from the camera onto one signal line for input to the camera controller, and unserializing, by the camera controller for output to the lamp controller, the horizontal synchronization signal and the vertical synchronization signal onto two signal lines.

8. The method of claim 7, wherein the controlling includes:

estimating the long exposure section as a section in which the vertical synchronization signal is input from the time section in which the horizontal synchronization signal is input after the short exposure section.

9. The method of claim 7, wherein the controlling includes: receiving the horizontal synchronization signal and the vertical synchronization signal of an image captured through the camera from the camera.

10. The method of claim 7, wherein the controlling includes: receiving the horizontal synchronization signal and the vertical synchronization signal of an image captured through the camera from the camera controller.

11. The method of claim 7, further comprising:

blocking current supplied to the light source to turn off the light source in the short exposure section, and supplying the current to the light source to turn on the light source in the long exposure section.

12. The method of claim 7, further comprising:

estimating an end point of the short exposure section when a first vertical synchronization signal is input.

13. The method of claim 7, further comprising:

estimating an end point of the long exposure section when a second vertical synchronization signal is input.

14. A non-transitory computer-readable medium recording a program to perform the lamp controller interlocking method of the camera built-in headlamp, the method comprising:

causing a camera controller to generate a single frame image by composing an image captured in a short exposure section, in which a shutter opening time of a camera is relatively short, and an image captured in a long exposure section, in which the shutter opening time of the camera is relatively long, through a camera controller included in a headlight module integrated with the camera and a light source;

causing a lamp controller to control the light source to emit more light in the long exposure section more than in the short exposure section in synchronization with the relatively long shutter opening time of the long exposure section and the relatively short shutter opening time of short exposure section of the camera, wherein the lamp controller estimates the short exposure section as a section in which a vertical synchronization signal is input from a time section in which a horizontal synchronization signal is input after a start point of one predetermined frame period, wherein the lamp controller estimates the long exposure section as a section in which the vertical synchronization signal is input from the time section in which the horizontal synchronization signal is input after the short exposure section;

serializing the horizontal synchronization signal and the vertical synchronization signal output from the camera onto one signal line for input to the camera controller, and unserializing, by the camera controller for output to the lamp controller, the horizontal synchronization signal and the vertical synchronization signal onto two signal lines.

* * * * *